Oct. 30, 1934.  E. R. SHEPARD  1,978,440
ELECTRIC MEASURING DEVICE
Filed Aug. 31, 1931   3 Sheets—Sheet 2
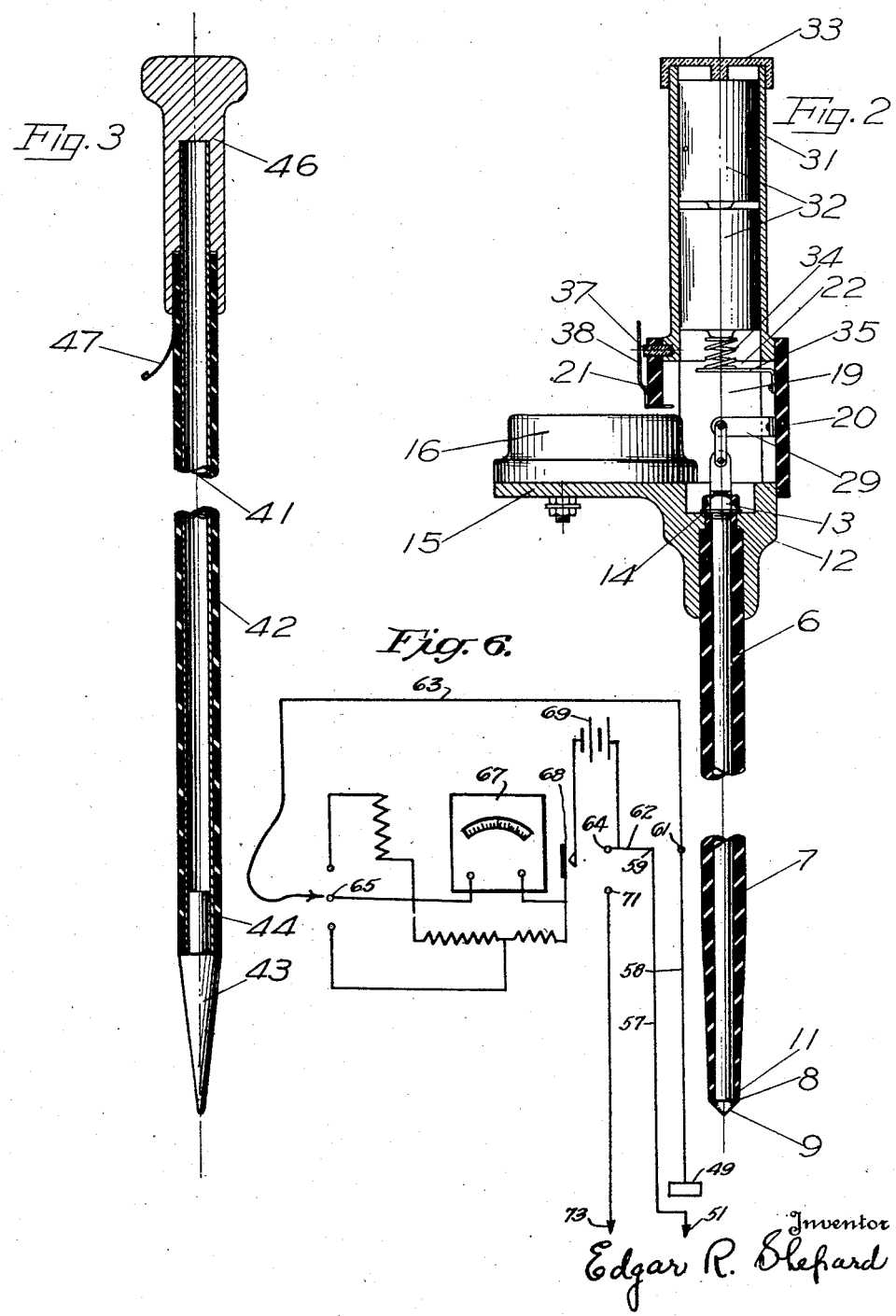
Inventor
Edgar R. Shepard
By
J. F. Motherhead
Attorney Oct. 30, 1934.  E. R. SHEPARD  1,978,440
ELECTRIC MEASURING DEVICE
Filed Aug. 31, 1931   3 Sheets-Sheet 3
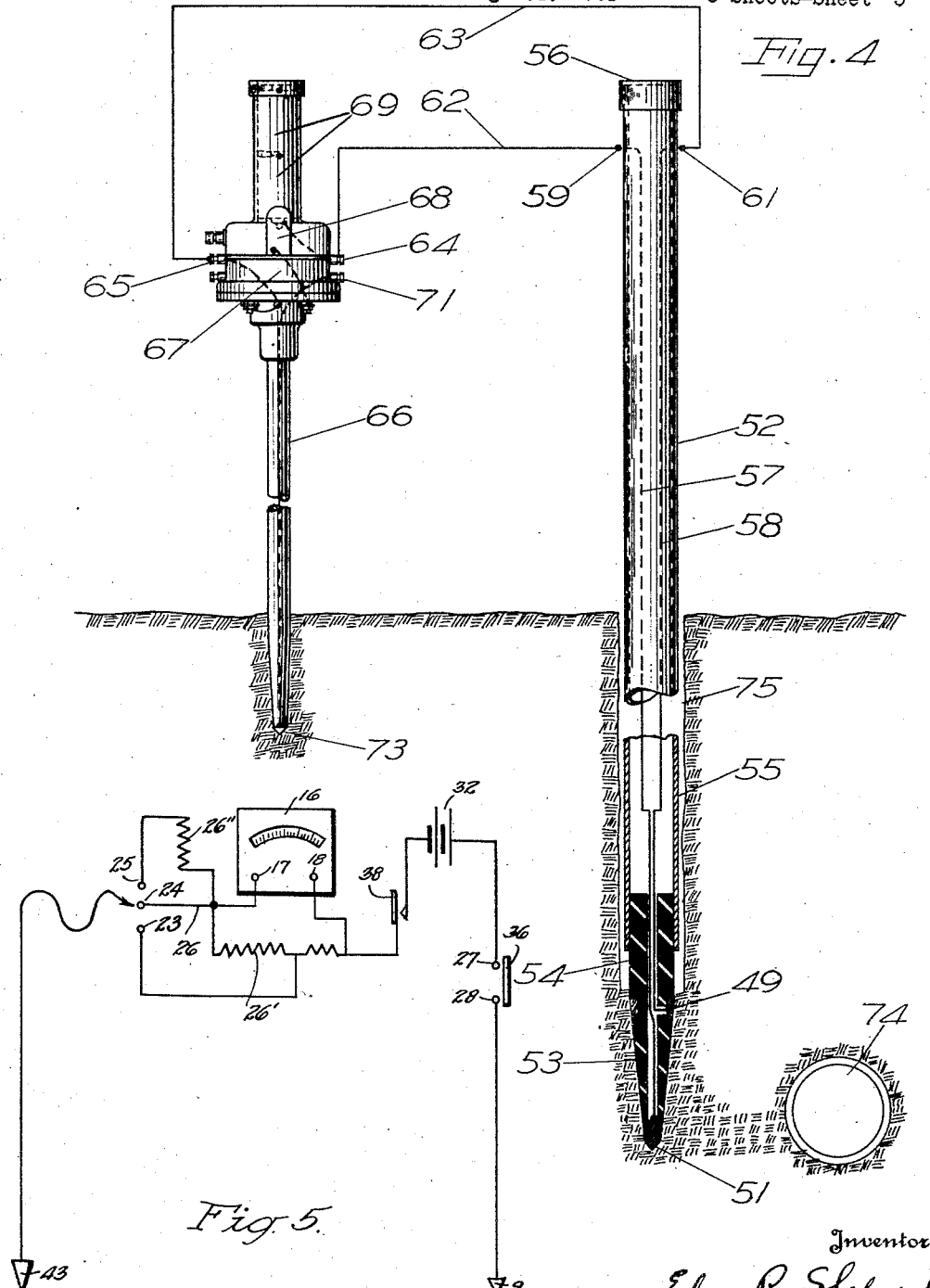

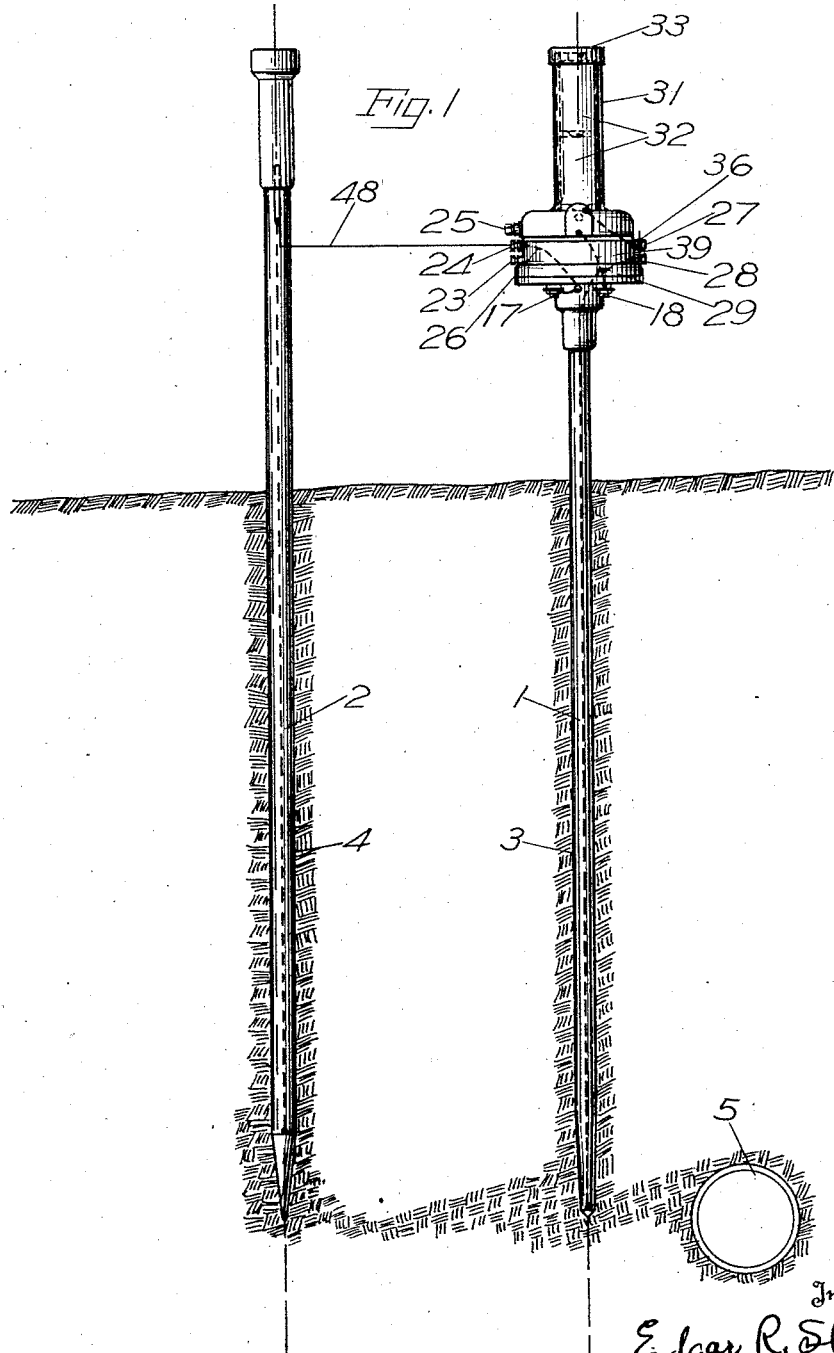

Patented Oct. 30, 1934

1,978,440

UNITED STATES PATENT OFFICE 1,978,440

ELECTRIC MEASURING DEVICE

Edgar R. Shepard, Chevy Chase, Md., assignor to the Government of the United States Application August 31, 1931, Serial No. 560,397

22 Claims. (Cl. 175—183)

(Granted under the act of March 3, 1883, as amended April 30, 1928; 370 O. G. 757)

The invention described herein may be manufactured and used by or for the Government for governmental purposes without the payment to me of any royalty thereon.

It is an object of the present invention to provide a simple and compact device of relatively light weight, particularly suitable for use in the measurement of the electrical resistivity of soils and the like.

Other objects of the invention will appear more fully from the following description, taken in connection with the accompanying drawings, wherein—

Fig. 1 is an elevational view, with the wiring shown diagrammatically, of one embodiment of the invention and illustrates a preferred application;

Fig. 2 is a transverse sectional view through one of the members shown in Fig. 1;

Fig. 3 is a similar view through the other member;

Fig. 4 is a diagrammatic view of the circuit arrangement of Figs. 1 to 3, inclusive;

Fig. 5 is a view similar to Fig. 1, but showing an alternative embodiment of the invention; and Fig. 6 is a diagrammatic view of the circuit arrangement of Fig. 5.

The electrical instrument constituting the present invention has a variety of applications, among which may be mentioned the determination of the chemical and physical properties of soil in connection with the classification of the same for agricultural purposes; and the location of corrosive areas along existing pipe lines or proposed sites for projected pipe lines where excessive corrosion of the pipe line would occur.

Considering, by way of illustration, the invention in connection with the latter application, it has been found that there is a relation between the electrical resistivity of soil and its corrosive properties. For example: if there is an abrupt change in soil resistivity along a pipe line, or if there is a section of unusually low resistivity, an excessive amount of corrosion is found on the pipe.

The mapping of these zones of excessive corrosion is of considerable importance, particularly in connection with projected pipe lines, since it eliminates the necessity for providing protective means to the pipes throughout the entire length thereof in order to assure proper protection at the relatively few unknown sections subjected to maximum corrosive action. The mapping of the zones is also of importance in connection with existing pipe lines, inasmuch as it makes possible the location of the sections of the pipe lines which are subject to corrosive action and the maintenance of proper protective covering on these sections.

In accordance with the present invention, an instrument is provided which makes possible the accomplishment of the above-desired results, permitting the measurement of soil resistivity and hence the detection of the corrosive areas. The instrument is designed for use in the field without the necessity for removing samples of earth to the laboratory for examination, as has heretofore been the practice. It is compact and simple to operate and requires no electrical connections to be made at the time of measurement or special arrangement or placement of samples of earth. This simplicity and convenience of the instrument makes possible the rapid measurement of soil resistivity over long sections of pipe lines, or over large areas intended for projected lines.

This instrument may take several different forms of which Figs. 1 to 4, inclusive, and Figs. 5 and 6 are illustrative. Considering, first, the form shown in Figs. 1 to 4, inclusive, it will be noted that the instrument comprises a pair of elongated rods 1 and 2, which are adapted for insertion into the ground through openings 3 and 4, respectively. The openings may be conveniently formed adjacent to a pipe line 5 by means of an auger, or merely by pushing the rods into the soft earth.

Referring, first, to rod 1, which is termed the anode rod, it will be observed that this rod comprises a metal core 6 (Fig. 2) which may be made of steel. This core 6 is sheathed throughout substantially its entire length by means of an insulating covering 7 formed preferably of rubber or "Bakelite" tubing. The lower end of the insulating tubing 7 abuts against a shoulder 8 of an electrode 9 which is conveniently secured to the lower end of the core 6 by means of a brazed connection 11. Thus the electrode 9 is not covered by the sheath 7 and provides the only exposed metallic surface for contact with the material to be tested. Conveniently, the surface is of conical form, so as to engage the material to be tested with a wedging action, when the rod 1 is inserted in the ground, and thereby assure a contact with the material over the entire exposed surface of the electrode.

In accordance with the present invention, a bracket 12, which may take the form of an aluminum casting, is mounted on the rod 1 at the upper end of the insulating sheath 7, and it is secured in this position by means of a nut 13 which is threaded on the upper end of the steel core 6. A fibre washer 14 prevents contact between the rod 6 and the bracket 12.

The bracket 12 is conveniently provided with a horizontal outwardly projecting section 15 affording a suitable mounting for a measuring instrument 16. The instrument is so positioned that a pair of instrument terminals 17 and 18 (Fig. 1) extend through and are insulated from the horizontal supporting section 15 and permit suitable connection thereto from the under side of said supporting section.

The aluminum casting 12 is further provided with an upwardly extending section, forming a chamber 19, as shown in Fig. 2. The open portion of the rear side is closed by means of a plate 20, while the front side is partly closed by means of a plate 21, the lower edge of which extends down to a point just above the upper surface of the measuring instrument 16. The remaining sides are closed by plates 22. The plates 20, 21 and 22 may be formed of insulating material such as rubber or "Bakelite".

One of the side cover plates 22 is provided with binding posts 23, 24 and 25 (Fig. 1). The inner end of the binding post 24, which is positioned in chamber 19, is connected by a conductor 26 (Fig. 1) to the exposed instrument terminal 17. The inner end of the binding post 23 is connected to an intermediate point on a resistor 26' shunted across the instrument terminals 17 and 18, thus affording a different range of measurement for the instrument than that provided by the binding post 24. The inner end of binding post 25 is connected through a resistance 26'' (Fig. 4) to the binding post 24, and is employed when it is desired to use the instrument 16 for voltage measurement, as will presently appear in greater detail. The opposite cover plate 22 is provided with a pair of binding-posts 27 and 28, the inner end of binding post 28 being conveniently connected by means of a strap connection 29 (Fig. 2) to the upper end of the iron core 6.

The aluminum casting is further extended upwardly above the chamber 19 to form the tubular section 31 which may conveniently serve as a hand-grip. This section is preferably adapted to receive a source of direct-current energy, as for example, a pair of flash-light batteries 32. These batteries are so positioned as to be connected in a series-circuit relation, with the upper or negative battery terminal in contact with a brass cap 33 which serves to cover the open upper end of the tubular extension 31. The lower or positive terminal of the battery 32 is in engagement with a spring support 34, formed of conducting material. This support is mounted on an arm 35 of a conducting strap supported on the rear side plate 20 and is electrically connected to the binding post 27. This binding-post 27 and the binding-post 28 may, for reasons which will presently appear, be connected or disconnected at will by means of a conducting strap 36 on the outside.

The front cover plate 21 has conveniently mounted thereon a switch shown in Fig. 2 as comprising a stationary contact member 37 and a movable contact member 38 of spring material so positioned as to be normally out of engagement with the stationary contact member. This stationary contact member extends through the cover plate 21 and makes contact with the aluminum tubular section 31, which in turn is in electrical connection with the upper or negative terminal of the direct-current source of energy. The spring strap 38 constituting the movable contact member of the switch 37 is connected by means of a conductor 39 (Fig. 1) to the instrument terminal 18.

Referring to the rod 2, termed the cathode rod, which is designed for cooperation with the rod 1, it will be observed that this rod comprises a metal core 41 (Fig. 3) which may conveniently take the form of a steel tube. As in rod 1, this core is sheathed by means of insulating covering conveniently formed of a rubber or "Bakelite" tube 42. The lower end of the rod 2 is provided with an exposed conical electrode 43 having a cylindrical extension 44 fitting into the lower end of the steel tube 41. As in the electrode 9, the conical shape of this electrode 43 results in a wedging action in the material to be tested in contact therewith when the rod 2 is inserted in the ground, thus insuring contact with this material over the entire exposed surface of the electrode.

The upper end of the measuring rod 2 is provided with a metal cap 46 which fits over the adjacent upper portion of the metal tube 41 and the insulating sheath 42, forming a convenient handgrip. The cap 46 is sufficiently strong so that, if hand-pressure is not sufficient to imbed the electrode 43 in the soil to be tested, it can be driven to the desired depth by a hammer or other similar means.

A conducting strap 47 has its inner end connected to the steel tubing 41 adjacent to the upper end thereof, while its outer end is positioned so as to afford an external connection for a flexible connecting wire 48 (Fig. 1). The end of the connecting wire 48 opposite to that connected to the terminal 47 is connected to one of the binding posts 23 or 24, depending upon which scale of the measuring instrument 16 is to be used.

Assuming the apparatus embodying the present invention is to be used in a soil survey along an existing pipe line, the rods 1 and 2 are inserted into the soil, say, one foot apart, and the electrodes 9 and 43 forced into firm contact with the adjacent soil. Such contact is assured by reason of the wedging effect resulting from the conical form of these electrodes. Should it be more convenient to use a shallow excavation or the side of an open trench adjacent to the pipe line, equally satisfactory results are obtained.

With the electrodes 9 and 43 in the position shown in Fig. 1, the pressing of the movable switch member 38 into contact with the stationary coacting member 37 completes a circuit which extends from the switch member 37 through the tubular section 31 of the aluminum casting, the cap 33, the flash light batteries 32, the spring 34, the conductor 35, the binding post 27, the conducting strap 36, the binding post 28, the strap-connection 29, the metal core 6, the electrode 9, the ground between the two electrodes 9 and 43, the electrode 45, the steel tube 41, the contact terminal 47 for the rod 2, the connecting wire 48, the binding post 24, the conductor 26, the measuring instrument 16, the conductor 39, to the movable switch member 38 of the switch.

The current traversing this circuit causes the deflection of the movable needle of the measuring instrument 16, and the reading of this instrument is an indication of the resistivity of the soil. In practice, the apparatus is preferably calibrated so that the actual resistivity of the soil may be read directly from the measuring instrument 16. The foregoing is a description of the resistivity measurement at one point along the length of a pipe line. Successive measurements may be quickly and conveniently made at other desired points.

In the course of the experimental development of the foregoing apparatus, considerable difficulty was experienced by reason of the fact that polarization occurred at the surface of the negative electrode or cathode 43. Such polarization very greatly impaired the accuracy of the resistivity measurements. Polarization is largely a cathode effect and is proportional to the current density. In accordance with the present invention, these undesirable results are largely overcome by decreasing the current density on the exposed surface of the cathode electrode 43, so that it is relatively small compared with that on the exposed surface of the anode electrode 9. This is conveniently accomplished, as shown in Fig. 3, by increasing the exposed surface area of the cathode electrode 43, so that its area of contact with the material to be tested is considerably larger than that of the anode electrode 9. Practical experience has shown that as a result of thus constructing the electrodes 9 and 43, polarization is reduced to such an extent that results are obtained which compare favorably with those from measuring apparatus using alternating currents.

Should it be desirable to measure the voltage of the flash light batteries 32, this may be readily accomplished by connecting binding posts 25 and 27 by means of a conductor (not shown). Upon pressing the switch contact 38 this connection results in a closed circuit which includes the instrument 16, the flash light batteries 32, and the resistance coil 26" connected between the binding post 25 and the binding post 24. This resistance coil is so designed that the instrument reading represents the voltage of the flash-light batteries 32.

Coming now to the embodiment of the invention shown in Figs. 5 and 6, it will be observed that a pair of electrodes 49 and 51 are mounted on the lower end of a measuring rod 52. The electrode 51, which is connected to serve as the anode, is secured in the lower end of an insulating supporting member having a lower conical section 53 and an upper cylindrical section 54. This insulating member may be formed, for example, of rubber or "Bakelite". The electrode 51 has a conical surface which corresponds in position and function to that of the electrode 9 shown in Fig. 2. The electrode 49 which is connected to serve as a cathode is in the form of a ring positioned to fit in a recess formed in the conical bakelite section 53 at the upper end thereof. This electrode corresponds in function to the cathode electrode 43, Fig. 3, and it has a relatively large exposed surface area compared to that of the anode 51 so as to minimize polarization.

The upper cylindrical section 54 of the supporting member is fitted into the lower end of a steel tube 55, the upper end of which is closed by cap 56. Conductors 57 and 58 extend from the anode 51 and the cathode 49, respectively, to external connection points 59 and 61. From here, conductors 62 and 63, respectively, extend to binding posts 64 and 65 of a measuring rod 66, which is identical in construction with a measuring rod 1 illustrated in Figs. 1 and 2, being provided with a measuring instrument 67, a switch 68, and a direct current source of energy 69. It will be noted, however, that the binding post 64 and the binding post 71, which correspond to the binding posts 27 and 28 of measuring rod 1, are not interconnected by a strap as shown in Fig. 1. This change in connection is brought about by the fact that anode 73 of the measuring rod 66 is replaced in the electrical circuit by the anode 51 on the measuring rod 52.

In operation, the measuring rod 52 is positioned in close proximity to the desired section of a pipe line 74, as by means of an auger hole 75, with the conical contact surface of the electrodes 49 and 51 positioned in wedging engagement with the adjacent soil. Switch 68 is then closed, with the result that the electrical circuit is completed. It will be observed that this circuit includes the instrument 67, the switch 68, the direct-current source of energy 69, the electrodes 49 and 51, and the soil positioned there-between. With the closing of the circuit, the indicating needle of the instrument 67 is deflected to a position upon the scale which indicates the resistivity of the soil under measurement.

By properly selecting the areas of electrodes 49 and 51 and also the distance between them, it is possible to obtain the same resistivity indications on the meter as when using rods 1 and 2. Experience has shown that the results obtained by this apparatus compare favorably with those obtained with the apparatus shown in Fig. 1. The apparatus under consideration, however, has the added advantage that only a single auger hole is necessary. This is of considerable importance when the holes are deep and when a large number must be drilled in succession.

It will be noted that the invention may be variously modified and embodied within the scope of the subjoined claims.

I claim:

1. In an electrical device adapted for the measurement of the electrical resistivity of soil and the like, an anode and a cathode adapted to engage the material to be measured, said cathode having a relatively large surface area adapted to engage said material, compared with that of said anode, whereby polarization may be reduced to a minimum.

2. In an electrical device adapted for the measurement of the electrical resistivity of soil and the like, a pair of electrodes, supporting means for said electrodes, and electrical measuring means connected to said electrodes and supported by said first mentioned means, said electrodes having exposed surfaces adapted to contact with said material to be tested, and said surfaces differing in areas, one from the other, with the cathode surface having the greater area.

3. In an electrical device adapted for the measurement of the resistivity of soil and the like, a pair of electrodes, and a source of direct-current energy connected thereto, said electrodes having exposed surfaces, the relative dimensions of said exposed surfaces being different and such that the current density on the exposed surface on the cathode is relatively small compared with that on the anode.

4. In an electrical device adapted for the measurement of the electrical resistivity of soil and the like, a pair of electrodes, a source of direct-current energy adapted to be connected to said electrodes, electrical measuring means, and supporting means for said electrodes, energy source and measuring means, said electrodes having surfaces adapted to be exposed to said material, said surfaces being of different dimensions, so as to provide different areas of contact with said material to be tested, the cathode surface having the larger area of contact.

5. In an electrical device adapted for the measurement of the electrical resistivity of soil and the like, a pair of electrodes having exposed surfaces, at least one of which is wedge-like, the cathode surface being relatively large compared with that of the anode, so that the current density on the cathode is relatively small and polarization thereby minimized or substantially eliminated.

6. In an electrical device adapted for the measurement of the resistivity of soil and the like, a pair of electrodes having exposed surfaces adapted to contact with the soil, said surfaces being so proportioned that the cathode surface is larger than the other surface, a source of energy connected to said electrodes, and electrical measuring means responsive to the passage of current between said electrodes, at least one of said surfaces being of conical-like form adapted to exert a wedge-like action when forced into the soil.

7. In an electrical device adapted for the measurement of the electrical resistivity of soil and the like, a pair of electrodes having conical surfaces adapted to engage the material to be tested, the cathode surface being larger than the other surface.

8. In an electrical device adapted for the measurement of the electrical resistivity of soil and the like, a pair of electrodes and means for supporting said electrodes comprising a pair of rods, the exposed surface of the cathode electrode being larger than that of the other electrode.

9. In an electrical device adapted for the measurement of the resistivity of soil and the like, a supporting member, electrodes respectively mounted on the end and intermediate the ends of said member, said electrodes being provided with exposed surfaces adapted for engagement with the material to be tested, the exposed surface of the anode being smaller than that of the cathode, a source of electrical energy connected to said electrodes, and a measuring device responsive to the passage of currents between said electrodes and through the soil, said measuring device being calibrated in terms of soil resistivity.

10. An electrical instrument adapted for the measurement of the resistivity of soil and the like, comprising a pair of supporting rods and electrodes respectively mounted on the ends of said rods and having exposed surfaces for engagement with the material to be tested, the exposed surface of the cathode being relatively large compared with that of the anode, a source of electrical energy, and a measuring device supported on one of said rods responsive to the passage of currents between said electrodes.

11. An electrical device adapted for the measurement of the resistivity of soil and the like, comprising a plurality of electrodes, wherein the exposed surfaces adapted for contact with the material to be tested are of different dimensions so as to render polarization substantially negligible, means for supporting said electrodes comprising a plurality of rods, a source of electrical energy supported by at least one of said rods, and a measuring device supported by one of said rods and responsive to the passage of currents between said electrodes.

12. In an electrical measuring device, a supporting rod provided with an exposed contact surface for engagement with the material to be tested, a bracket secured to said rod, a measuring instrument supported on said bracket, said bracket being provided with a chamber, and a battery positioned in said chamber connected to said instrument and said electrode.

13. In an electrical measuring device, a rod comprising a metal core and an insulating protective sheath, said rod being provided with an exposed electrode at one end adapted to engage the material to be tested, said electrode constituting an extension of said core, a measuring instrument, a bracket for supporting said instrument adjacent to the other end of said rod, said bracket being provided with an extension forming a chamber, a battery in said chamber, and a switch for controlling the electrical circuit including said electrode, said instrument and said battery.

14. In an electrical device adapted for the measurement of the resistivity of soil and the like, a pair of electrodes, a supporting member for one of said electrodes comprising an elongated metal core to one end of which said last-mentioned electrode is connected, said metal core being provided with an insulating protective sheath, a bracket secured to said member, a source of electrical energy supported by said bracket, a measuring instrument mounted on said bracket, and a switch for controlling the circuit including said electrodes, said measuring device and said source of energy.

15. In an electrical device adapted for the measurement of the resistivity of soil and the like, a pair of rods provided with metal cores respectively insulated and protected by surrounding sheaths, said cores having exposed electrodes adapted to be engaged by the material to be tested, said electrodes having exposed surface areas of different dimensions whereby the current density on the cathode electrode is relatively small and polarization thereby reduced to a minimum, a source of direct current energy supported on one of said rods, a measuring instrument responsive to the passage of currents between said electrodes supported on one of said rods, and a switch carried by one of said rods for controlling the passage of currents between said electrodes.

16. In an electrical device adapted for the measurement of the resistivity of soil and the like comprising a rod provided with a pair of electrodes having exposed surface areas of different dimensions adapted to contact with the material to be tested, the cathode surface having the greater area, a source of electrical energy, and a measuring device responsive to the passage of currents between said electrodes.

17. In an electrical device adapted for the measurement of the electrical resistivity of soil and the like, a rod provided with a pair of electrodes having exposed surfaces adapted for engagement with the material to be tested, said exposed surfaces being of different areas, the anode surface having the smaller area, a source of direct-current energy, and a measuring device responsive to the passage of currents between said electrodes.

18. A device for testing soil and the like, comprising a pair of electrodes of different surface areas adapted to be inserted into the soil to be tested, and means for causing the passage of currents from the smaller electrode through the soil to the larger electrode.

19. In an electrical device adapted for the testing of soil and the like, a pair of supporting rods, and electrodes respectively mounted on said rods having exposed surfaces, said surfaces being positioned at the ends of said rods and adapted to engage the material to be tested, the exposed surface of the cathode electrode being larger than that of the anode electrode.

20. In apparatus of the class described, a pair of supporting members, and electrodes respectively mounted on said members, said electrodes having exposed conical surfaces adjacent to the ends of said members, the exposed surface of the cathode electrode being larger than that of the anode electrode.

21. In an electrical device adapted for the testing of soil and the like, a supporting member, electrodes mounted on said member having exposed surfaces positioned respectively at the end of said member and intermediate the ends thereof, the exposed anode surface being smaller than that of the cathode surface.

22. In an electrical device adapted for the testing of soil and the like, a supporting member, an electrode positioned at the end of said member and having a conical-like exposed surface, and an electrode positioned intermediate the ends of said member and having an exposed surface, the exposed surface of the cathode electrode being larger than that of the anode electrode.

EDGAR R. SHEPARD.